INVENTORS
EDMUND VAN KAICK
AND HUGO HESS
BY
ATTORNEY

May 29, 1956  E. VAN KAICK ET AL  2,748,342
INTERNAL POLE GENERATOR FOR ALTERNATING CURRENTS
Filed Aug. 27, 1952  3 Sheets-Sheet 2

INVENTORS
EDMUND VAN KAICK
AND HUGO HESS.
BY
ATTORNEY.

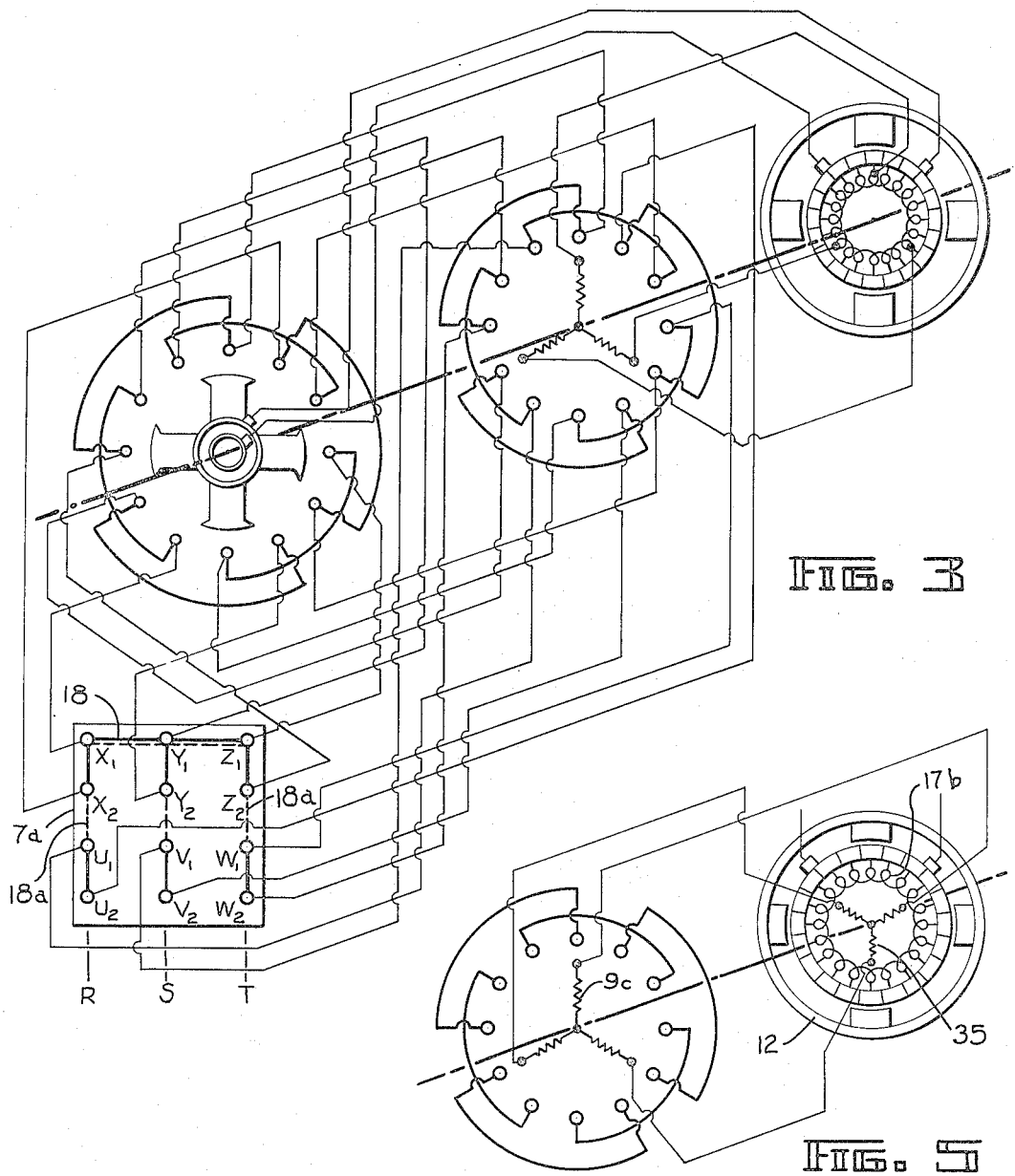

United States Patent Office 2,748,342
Patented May 29, 1956

2,748,342

INTERNAL POLE GENERATOR FOR ALTERNATING CURRENTS

Edmund van Kaick, Frankfurt am Main, Germany, and Hugo Hess, Zurich, Switzerland Application August 27, 1952, Serial No. 306,644

Claims priority, application Germany August 28, 1951

4 Claims. (Cl. 322—28)

This invention relates to an internal pole generator for rotary (three-phase current) or alternating current, which is self-regulating in a manner which enables it to produce an absolutely even tension, or voltage, at various inductive, ohmic, or capacitative loads. The generator is thereby independent of the cos $\varphi$-value, that is, regulation of the generator is effected without regard to the variations in the phase displacement angle resulting from a varying load on the generator, and the generator is provided, merely for energization, with only two collector rings and one two-brush collector or commutator and thus has a low consumption of carbons with correspondingly increased reliability.

Self-regulating generators, up to the present, were mainly of the external pole type in which a main exciter winding and an additional exciter winding is provided in the stator. The additional winding in these machines becomes more or less excited in dependence of the load. This arrangement requires, apart from the two collectors, the provision of additional collector rings in accordance with the voltage to be produced, so that three, six, or in special cases up to twelve collector rings must be employed. The number of the brush holders and of the carbons must be chosen in accordance with the voltage required and which, in the larger size generators, have to be laid out up to a multiple. These generators are exceedingly complicated, unreliable, and expensive; their carbons are consumed in greater quantities and the wear on the collector rings is very great. Besides, increasing numbers of parts also increases the liability to disturbances of all sorts.

Self-regulating internal pole generators are also known, but in these machines the disadvantage prevails that self-regulation becomes possible only by the interarrangement of current transformers, rectifiers, or other additional devices. Besides, all machines of this kind are cos $\varphi$-dependent in accordance with the initial adjustment for their intended employment; in no case are they cos $\varphi$-independent in universal employment under variable load.

In a machine according to the invention the drawbacks just indicated are completely absent. The generator, owing to its being constructed without any additional aids, such as transformer motors, rectifiers, auxiliary windings, high frequency controls and the like, is cos $\varphi$-independent and remains constant under any load.

One of the features of the invention rests in that a variable voltage is coincided with the exciter voltage which, at various loads of the machine, corresponds exactly to the varying voltage. In this way the result is obtained that the excitation of the poles is directly influenced by the variable working current in a manner in which the initially adjusted excitation is coincided—oscillatingly so to say—by the required additional excitation including that resulting from the secondary variation effect.

The avoidance of high frequency disturbances becomes considerably simpler and cheaper to achieve as regards costs and construction than in the previously known types.

In the accompanying drawings several embodiments of the invention are illustrated by way of example.

Fig. 3 illustrates a generator in accordance with Fig. 1 with twelve connection terminals.

Fig. 5 is the diagrammatic representation of a generator in accordance with the invention, in which an inductive coupling is provided between the additional rotor winding and the exciter motor.

Figure 1:
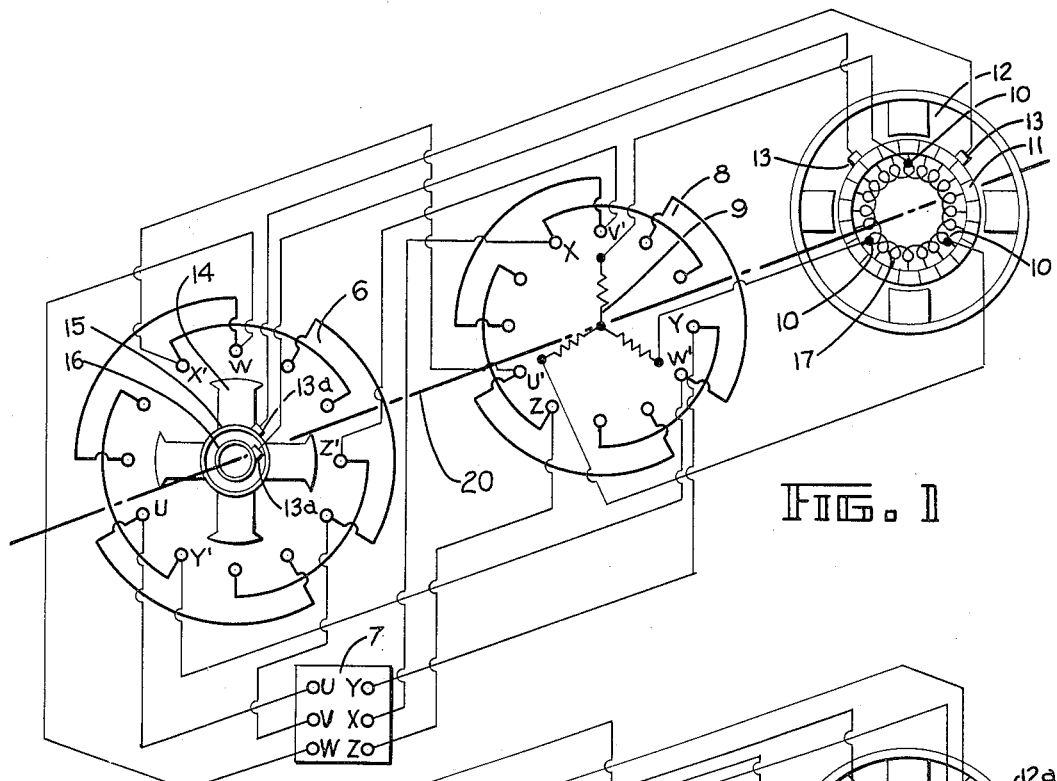
Fig. 1 is the diagrammatic representation of a four-pole exciter motor according to the invention with six connection terminals.

The wiring and schematic diagram shown in Fig. 1 illustrates a generator in accordance with the invention for a rotary current internal pole machine with a four-pole exciter machine and changeable between two voltages. The ends of the windings of the main stator 6 are connected to the terminals $u$, $v$, $w$ of the rotary current terminal board 7, whereas the ends $x'$, $y'$, $z'$ are connected to the leading-in ends of the windings 8 of the additional excitation $u'$, $v'$, $w'$.

The ends $x$, $y$, $z$ of this winding 8 of the stator of the additional excitation are connected to the terminals $x$, $y$, $z$ of the terminal board 7. The rotor 9 of the additional stator also has a three-phase winding which, in the present case, is a star-connection, the ends of which are connected to the segments 10 of the collector 11 of the exciter machine 12, which are mutually displaced by 120°. The usual brushes 13 of this exciter machine are connected, by way of conductors, brushes 13a and two collector rings 15 and 16, to the armature 14 of the generator which contains the main stator winding 6. It is to be understood that the rotor windings 9, 14 and 17 all rotate together on a common shaft 20, represented by a broken line on Fig. 1, and that the collector 11 and slip rings 15 and 16 also rotate with the shaft 20.

By this aforesaid arrangement the current which flows through both the main winding 6 and the auxiliary winding 8 and which varies in accordance with the load, produces a variable alternating tension in winding 9, which coincides with that which is produced in the armature 17 of the exciter machine. In this way a direct influence is exerted on the current flowing to the armature 14 in accordance with the working current and, therewith, the automatic regulation of the machine is effected.

Figure 2:
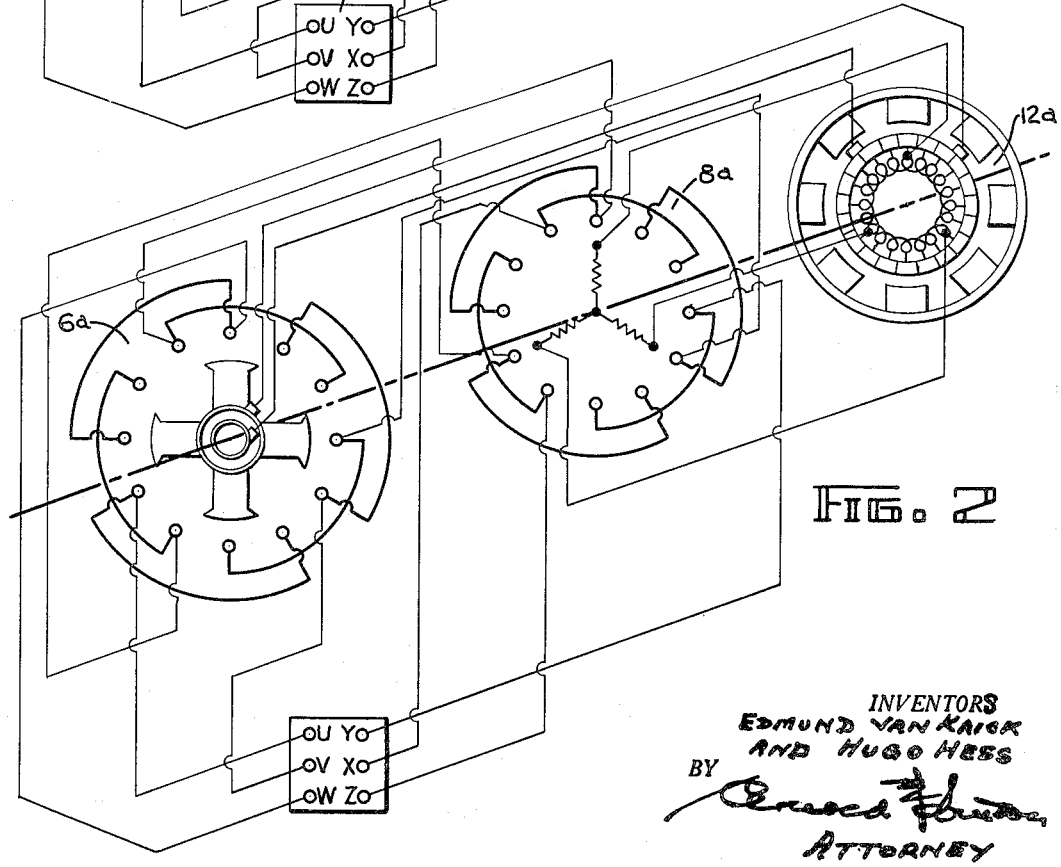
Fig. 2 is a representation similar to Fig. 1 in which an eight-pole exciter motor is used.

While in the example shown in Fig. 1 the rotation fields of the main stator 6 and of the additional stator 8 are equidirected, an alternating current of 50 periods is induced in the additional rotor 9, which is directed to the collector 11, where it is rectified and coincided with the main exciter current of the armature 13, the generator represented in Fig. 2 has its stator windings 6a and 8a so connected that rotation fields thus produced are counter-directed. Hereby an alternating current of 100 periods is induced in the winding 9a which, in the same way as has just been described, is coincided with the exciter current of the now 8-pole exciting machine 12a.

In the examples above described a terminal board with six terminals for the taking off of two different voltages in accordance with the respective connections is being used. Fig. 3 shows a diagram of the generator represented in Fig. 1 in which, however, the connections are so chosen that by the use of a terminal board 7a with twelve terminals several different voltages can be picked up, as for example 110, 190, 220, and 380 volts just according to how the interconnections between the terminals are arranged. In the examples given in Fig. 3 the cross connections 18 are drawn in full lines and are positioned so that a tension of 190 volts can be picked up from the lowermost terminals R, S, T. With the cross connections 18a proceeding along the broken lines, then a tension of 380 volts can be picked up from the same terminals R, S, T.

Figure 4:
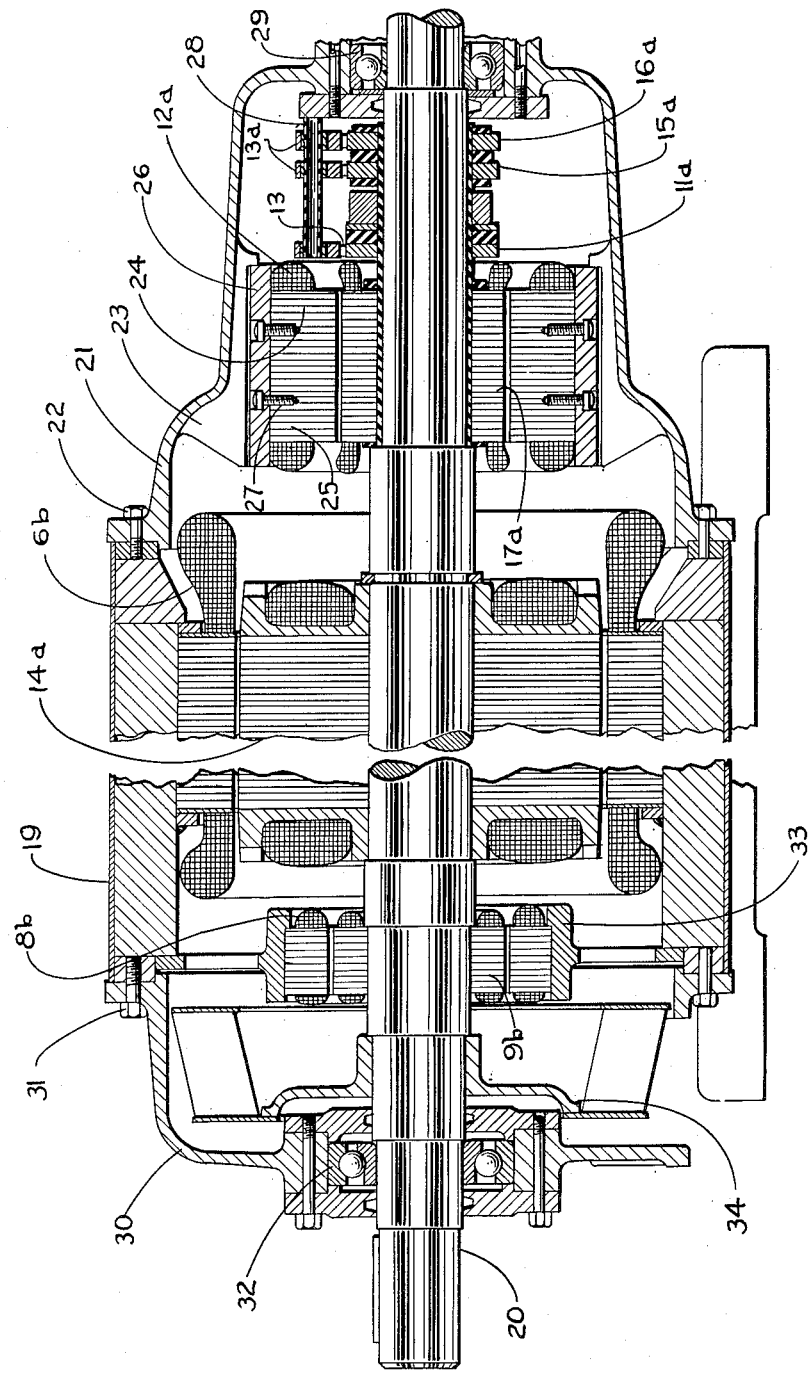
Fig. 4 is a longitudinal section through a generator constructed in accordance with the invention.

Fig. 4 shows in detail that, as is usual, the main stator is positioned with its windings 6b fast in the generator casing 19 so as to operate together with the armature 14a, which is keyed to the generator shaft 20. To the other side of the generator casing 19 is flanged the end shield 21 by means of bolts 22. Positioned upon the ribs 23 within the said end shield is the stator, or the pole ring 24, of the main exciter machine 12a, the individual pole shoes 25 of which are attached to the pole ring 26 by means of bolts 27. The armature 17a with the corresponding winding of the main exciter machine is also keyed to the generator shaft 20. Pole ring 26 of the exciter machine is turnably positioned in the end shield 21, so that an accurate adjustment can be produced when the machine is being fitted together. Fixing the ring 26 can then be effected for example by means of a set screw or a grub screw which, however, is not shown in the drawing.

The collector 11a is positioned in front of the exciter machine and connected in known manner with the armature winding of the rotor 17a, while the two collector rings 15a and 16a, which are also positioned on the shaft 20, are connected to the winding of the rotor 14a. Arranged within the range of the collector 11a and of the collector rings 15a, 16a is the brush holder 28 which is angularly adjustable and can also be fixed during the setting up of the machine in accordance with the adjustment of the pole ring 26.

At its outer end the end shield 21 is supported on the shaft 20 by means of the bearing 29, while at its other side the casing 19 is closed by an end shield 30 which is fixed thereto by means of bolts 31 and supported on the shaft 20 by the bearing 32.

The additional stator winding 8b is arranged in a rotatable ring 33. It acts together with the rotor 9b, which carries the corresponding winding and which is keyed to the shaft 20. Owing to this turnable arrangement of ring 33 the stator 8b can be adjusted during the fitting of the machine as required and then secured by any suitable means such as set screws or grub screws which are not shown in the drawing.

Arranged between the additional excitation as formed by the stator 8b and rotor 9b and the bearing 32 is the fan 34 which is also keyed to the shaft 20.

The diagrammatic part-representation of a generator in Fig. 5, which corresponds in principle to the generator shown in Fig. 1, illustrates a different kind of coupling of the rotor winding 9c of the additional excitation with the armature winding 17b of the main exciter machine 12. The coupling, in this case, is inductive in as much as the ends of the rotor winding 9c are connected to the ends of an additional and also star-connected winding 35 within the range of the armature winding 17b of the exciter machine.

What we claim is:

1. In an alternating current generator having a main stator winding, a shaft having a main rotor winding thereon which is rotated with the shaft to impress a voltage across said main stator winding and an exciter for the main rotor winding including an exciter armature on said shaft connected electrically to said main rotor winding, a collector ring and stationary poles; regulating means for maintaining a constant voltage output as the load across said main stator winding varies, said regulating means comprising an auxiliary stator winding, means for connecting said auxiliary winding in series with the main stator winding so that the voltage across said auxiliary winding varies in accordance with the load, a star-connected rotor winding on said shaft in operative association with said auxiliary stator winding so that a regulating current is induced in said star-connected winding which corresponds to the load and phase displacement angle of the generator, and means connecting said star-connected rotor winding to said collector ring of the exciter at points spaced 120° around the latter so that the exciting current for the main rotor winding is influenced by the current generated in said star-connected rotor to maintain the voltage output at a substantially constant value.

2. The combination of an alternating current generator having a main stator winding, a shaft and a main rotor winding on said shaft; an exciter for said main rotor winding including relatively fixed poles, an armature on said generator shaft and means electrically connecting said exciter armature to said main rotor winding to exciter the latter; and regulating means adding a regulating current to the normal current flowing in said armature of the exciter which is proportional to the load and the phase displacement angle of said generator, said regulating means including an additional stator winding connected in series with said main stator winding, a star-connected rotor winding on said generator shaft, and means coupling said star-connected rotor winding to said armature of the exciter so that the current generated in said star-connected rotor winding influences the current generated in said exciter armature for energizing said main rotor of the generator.

3. The combination according to claim 2; wherein said additional stator winding and said poles of the exciter are angularly displaceable relative to each other and said main stator winding to standardize the current-voltage characteristics of the combination.

4. The combination according to claim 2; wherein said coupling means includes an inductive connection to said armature of the exciter.

References Cited in the file of this patent
UNITED STATES PATENTS

| | | |
|---|---|---|
| 816,395 | Steinmetz | Mar. 27, 1906 |
| 955,171 | Kicklighter | Apr. 19, 1910 |